United States Patent [19]

Miyazaki et al.

[11] Patent Number: 4,813,272
[45] Date of Patent: Mar. 21, 1989

[54] SEMICONDUCTOR PRESSURE SENSOR

[75] Inventors: Atsushi Miyazaki, Katsuta; Ryoichi Kobayashi, Toukai, both of Japan

[73] Assignee: Hitachi, Ltd., Tokyo, Japan

[21] Appl. No.: 80,102

[22] Filed: Jul. 31, 1987

[30] Foreign Application Priority Data

Aug. 1, 1986 [JP] Japan ................... 61-179983

[51] Int. Cl.⁴ .......................... G01B 7/16; G01L 7/08; G01L 9/08
[52] U.S. Cl. ........................ 73/708; 73/727; 73/766; 338/4
[58] Field of Search ............... 73/708, 720, 721, 726, 73/727, 729, 766, DIG. 4; 338/4

[56] References Cited

U.S. PATENT DOCUMENTS 4,173,148 11/1979 Yamada et al. ............... 73/766

FOREIGN PATENT DOCUMENTS 0113379 9/1980 Japan.

OTHER PUBLICATIONS

P. 62 of the "Collection of Papers Scheduled to be Presented at 36th Meeting of Applied Physics Society 24a-D-6 (1975)".

Primary Examiner—Donald O. Woodiel
Attorney, Agent, or Firm—Antonelli, Terry & Wands

[57] ABSTRACT

There is a bridge circuit which is driven by a constant-current including a thermistor. The bridge circuit is constituted by strain gages defined by P-type diffused layers. Strain gages which constitute in combination the bridge circuit are defined by diffused resistor layers having a surface impurity concentration which is set so as to fall within the range from $2.3 \times 10^{18}$ to $2.5 \times 10^{18}$ atoms/cm$^3$. The B constant of the thermistor is selected so as to fall within the range from 1400K to 2400K.

1 Claim, 4 Drawing Sheets

SEMICONDUCTOR PRESSURE SENSOR

BACKGROUND OF THE INVENTION

The present invention relates to semiconductor pressure sensors and, more particularly, to a semiconductor pressure sensor which is suitable for use in control of the ignition timing or fuel injection in automobiles and which enables high-precision temperature compensation over a wide range of temperatures.

In general, the semiconductor strain gage which constitutes a semiconductor pressure sensor is composed of a P-type diffused resistor formed on an N-type silicon substrate, and the temperature coefficient of resistance and the temperature coefficient of gage variation coefficient (resistance variation coefficient per unit of strain) are each dependent on the surface impurity concentration at the time of the diffusion.

It is disclosed in, for example, "Collection of Papers Scheduled to be Presented at 36th Meeting of Applied Physics Society 24a-D-6 (1975)", lines 16 to 19 on page 62 (presented by Shimazoe and Yamada), that, in the case where a pressure sensor in which a semiconductor strain gage of the type described above is formed on a silicon diaphragm in the form of a Wheatstone bridge, when this pressure sensor is driven with a constant current, the temperature coefficient of sensitivity reaches the minimum when the surface impurity concentration is $10^{18}$ atoms/cm$^3$ and $10^{20}$ atoms/cm$^3$, that is, the temperature variation coefficient of the semiconductor strain gage is zero at these surface impurity concentrations.

According to the statement in claim 1 of "Process for Producing Semiconductor Pressure-Sensitive Device", Japanese Patent Laid-Open No. 113379/1980 laid open to public inspection on Sept. 1, 1980, and the description in lines 3 to 6 on the right-hand column, page 353, it is possible to flatten the surface of the piezoresistance element used in a semiconductor pressure-sensitive device and minimize the temperature dependence of its sensitivity by setting the surface impurity concentration in the vicinity of $2 \times 10^{20}$ atoms/cm$^3$.

Pressure sensors, particularly those which are employed to control ignition timing or fuel injection in automobiles, are used in severe environments and are required to be capable of precisely measuring changes in the intake pressure within the intake manifold at from $-40°$ C. to $120°$ C.

With the above-described prior art, however, although it is possible to eliminate the temperature dependence within a relatively narrow temperature range, more specifically from $10°$ C. to $60°$ C., the prior art is temperature-sensitive in low or high temperature regions other than the above-described temperature range, and it is necessary to provide temperature compensation in the high and low temperature regions. In such a case, since semiconductor strain gages have positive temperature characteristics in the low and high temperature regions (described later in detail), it was considered impossible to effect satisfactory temperature compensation in both the low and high temperature regions with thermistors having positive temperature characteristics only. Accordingly, when compensation over a wide range of temperatures is needed, the temperature compensating circuit is disadvantageously complicated.

SUMMARY OF THE INVENTION

It is a primary object of the present invention to provide a semiconductor pressure sensor which is so designed that temperature compensation of sensitivity can be effected with a high degree of precision over a wide range of temperatures by means of a temperature compensating circuit which utilizes a thermistor and has a relatively simple arrangement.

To this end, the present invention provides a semiconductor pressure sensor wherein the surface impurity concentration of the strain gage is set at from $2.3 \times 10^{18}$ to $2.5 \times 10^{18}$ atoms/cm$^3$, and the temperature dependence of the strain gage within the low temperature region is compensated by means of a thermistor.

More specifically, according to the present invention, the surface impurity concentration of the semiconductor strain gage is set at from $2.3 \times 10^{18}$ to $2.5 \times 10^{18}$ atoms/cm$^3$ to provide the strain gage with one positive temperature characteristic in the low temperature region, and that characteristic in the low temperature region is compensated by the temperature characteristic of a thermistor, thereby effecting high-precision temperature compensation over a wide temperature range (from $-40°$ C. to $120°$ C.).

BRIEF DESCRIPTION OF THE INVENTION

Figure 7:
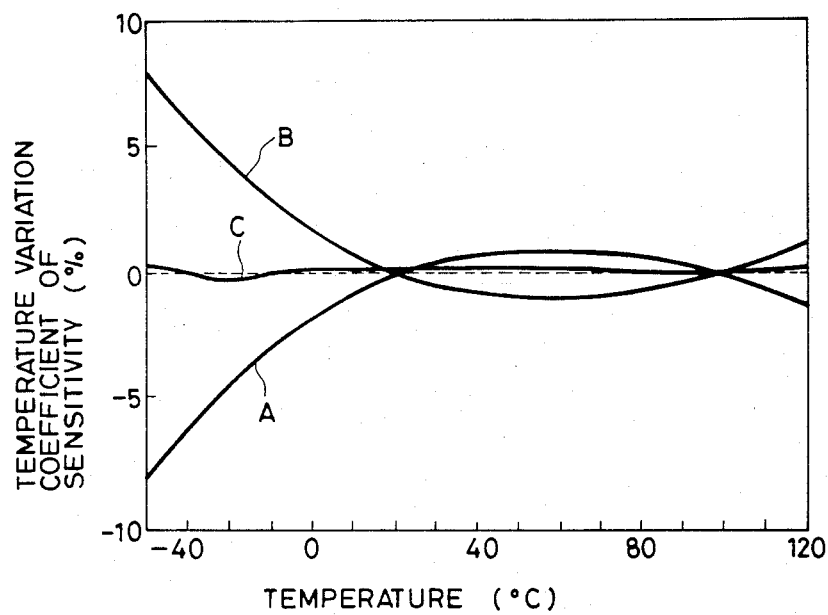
Figure 8:
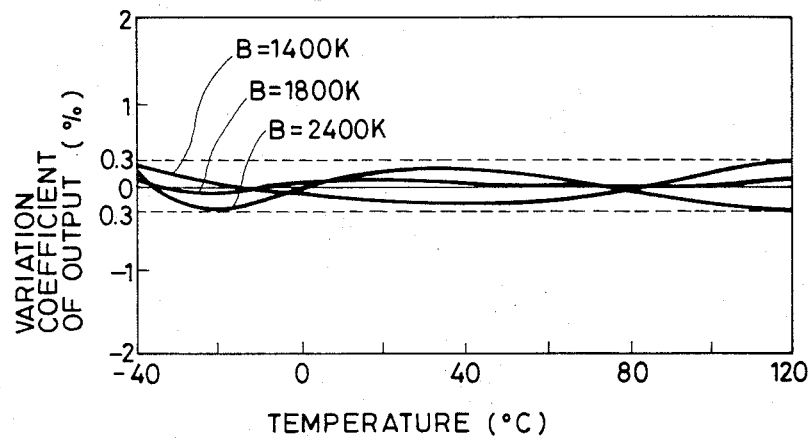

FIG. 7 is a characteristic chart showing the relationship between the temperature and the temperature variation coefficient of sensitivity for explaining the compensation for the output of the semiconductor pressure sensor according to the present invention; and FIG. 8 is a chart showing the sensitivity variation coefficient of the bridge output in the case where the B constant of the thermistor is varied.

DETAILED DESCRIPTION OF THE INVENTION

Figure 1:
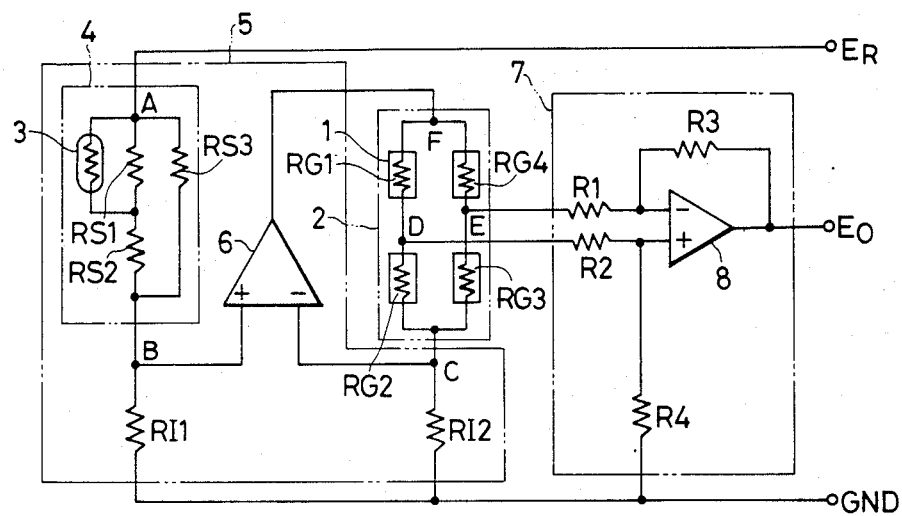
FIG. 1 is a circuit diagram showing one embodiment of the semiconductor pressure sensor according to the present invention.

Referring first to FIG. 1, four semiconductor strain gages 1 (RG1 to RG4) which are formed on an elastic substrate defined by an N-type silicon single crystal constitute in combination a Wheatstone bridge 2. A constant-current circuit 5 is connected to terminals C and F of the bridge circuit 2 to supply a constant current to the bridge 2.

The constant-current circuit 5 has an operational amplifier 6 which is connected at its output terminal to the terminal F of the bridge circuit 2. The terminal C of the bridge circuit 2 is connected to the ground (GND) through a fixed resistor RI2 and also connected to the negative (−) input terminal of the operational amplifier 6. To a constant-voltage source $E_R$ are connected a sensitivity temperature compensation circuit 4 and a fixed resistor RI1 in series, and the node B therebetween is connected to the positive (+) input terminal of the operational amplifier 6. The sensitivity temperature compensation circuit 4 consists of a thermistor 3, a fixed resistor RS1 connected thereto in parallel, a fixed resistor RS2 connected in series to the resistor RS1, and a fixed resistor RS3 connected in parallel to the resistors RS1, RS2. The node A is connected to the power source $E_R$.

The terminals D and E of the bridge 2 are connected to the positive (+) and negative (−) input terminals of a second operational amplifier 8 through fixed resistors R2 and R1, respectively. The positive (+) input terminal of the operational amplifier 8 is connected to the ground terminal GND through a fixed resistor R4. The output terminal ($E_0$) of the operational amplifier 8 is connected to the negative (−) input terminal of the operational amplifier 8 through a feedback resistor R3, thus constituting a differential amplifier 7.

Figure 2:
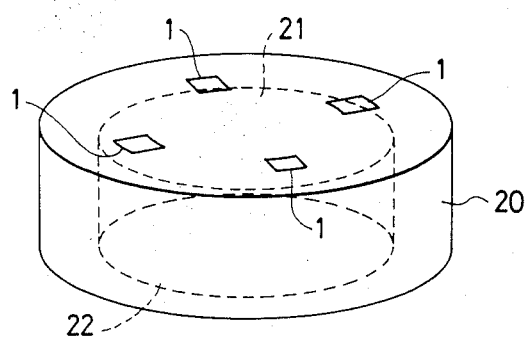
FIG. 2 is a perspective view of a silicon substrate on which is formed the bridge circuit shown in FIG. 1.

FIG. 2 shows one example of a silicon substrate 20 having the above-described bridge circuit 2 formed thereon. P-type diffused resistors 1 (RG1, RG2, RG3 and RG4) are formed on a diaphragm portion 21 of the silicon substrate 20 as described above, and according to the present invention, these P-type diffused resistors are defined by diffused resistors having a surface impurity concentration ranging from $2.3 \times 10^{18}$ to $2.5 \times 10^{18}$ atoms/cm$^3$. A recess 22 is formed in the bottom of the silicon substrate 20 so that, for example, a vacuum in an engine is introduced into the recess 22 to detect the level of the pressure.

Figure 3:
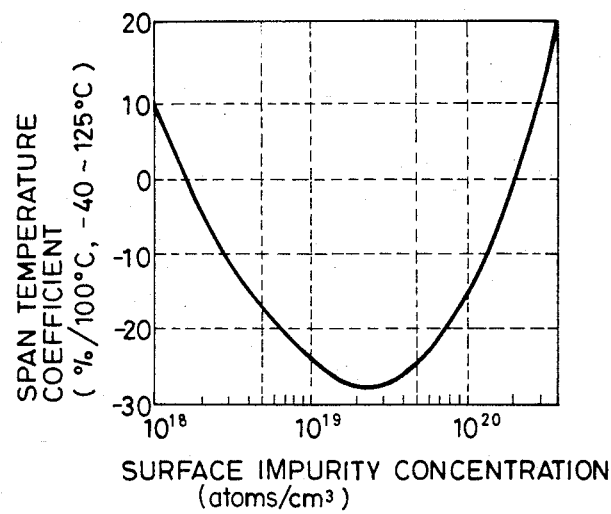
FIG. 3 is a characteristic chart showing the relationship between the surface impurity concentration and sensitivity temperature coefficient of the diffused resistors formed on the silicon substrate, in which the sensitivity temperature coefficient is obtained by converting the sensitivity coefficient between $-40°$ C. and $125°$ C. into the sensitivity coefficient per $100°$ C.

As is generally known, when a resistor is formed on an N-type silicon substrate by producing a P-type impurity-diffused layer therein, the temperature variation coefficient of the sensitivity is changed in accordance with the surface impurity concentration. FIG. 3 shows the relationship between the bridge output characteristic and the surface impurity concentration in the case where the bridge is formed using such P-type impurity-diffused resistors. As will be clear from the characteristic curve in FIG. 3, when the surface impurity concentration is in the vicinity of $2.0 \times 10^{18}$ atoms/cm$^3$ and in the vicinity of $2 \times 10^{20}$ atoms/cm$^3$, the temperature coefficient of sensitivity of the bridge is substantially zero (0). Thus, it is understood to be preferable to use diffused resistors having an impurity concentration such as that mentioned above.

Figure 4:
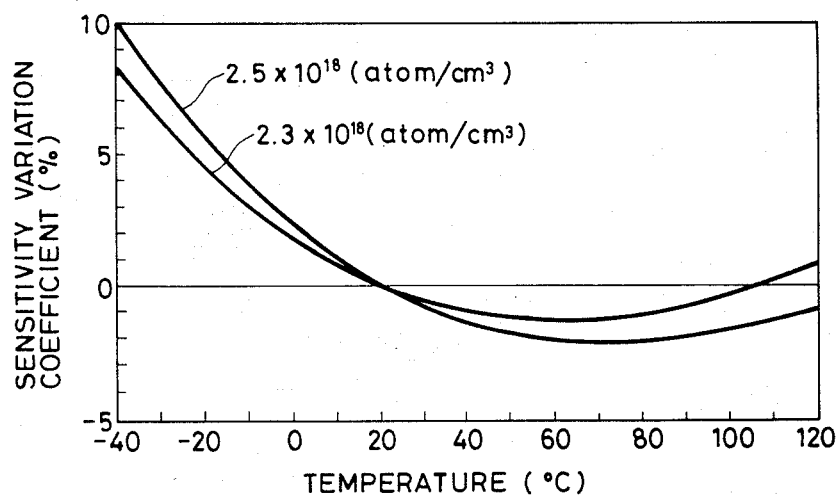
FIG. 4 is a characteristic chart showing the relationship between the temperature and sensitivity variation coefficient of diffused resistors formed at a predetermined impurity concentration which constitute in combination a pressure-sensitive bridge of the semiconductor pressure sensor according to the present invention.

However, in the present invention, the bridge circuit is constituted by impurity-diffused resistors having an impurity concentration which is particularly specified to be from $2.3 \times 10^{18}$ to $2.5 \times 10^{18}$ atoms/cm$^3$. This is because, as shown in FIG. 4, the sensitivity variation coefficient of the output of the bridge which is formed using diffused resistors having above-described impurity concentration has positive characteristics in the low temperature region (−40° C. to 20° C.) in the working temperature range of pressure sensors, and in the high temperature range (20° C. to 120° C.) the variation coefficient of the output sensitivity has a constant characteristic, i.e., the variation coefficient is within 2% and substantially 0%. More specifically, according to the present invention, a bridge having the above-described temperature variation coefficient is employed, and its positive characteristic in the low temperature region is compensated by means of the thermistor 3 (described later in detail), thereby obtaining a semiconductor pressure sensor having a sensitivity variation coefficient of substantially 0% over the temperature range from −40° C. to 120° C. Further, by setting the impurity concentration at a relatively low value such as that described above, it is possible to reduce the working time required to implant ions into the semiconductor strain gages 1, and therefore the semiconductor pressure sensor according to the present invention is economical and advantageous from the viewpoint of manufacture.

Figure 5:
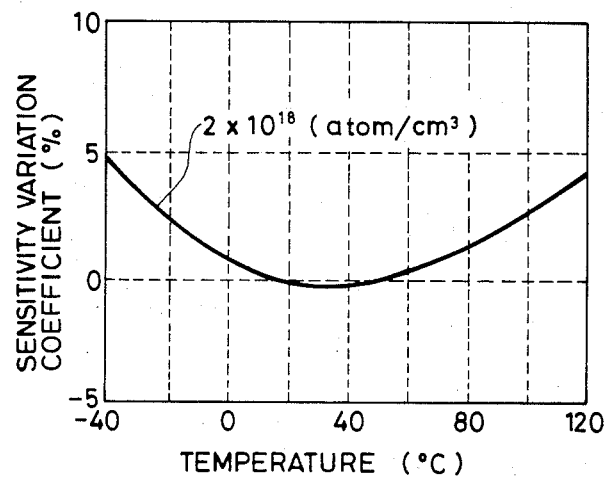
FIG. 5 is a characteristic chart showing the relationship between the temperature and sensitivity variation coefficient of diffused resistors formed at an impurity concentration which is different from that of the diffused resistors in the case of FIG. 4.

If the impurity concentration is outside the above described concentration range and is set at, e.g., $2 \times 10^{18}$ atoms/cm$^3$, the sensitivity variation coefficient has a positive characteristic in both high and low temperature regions as shown in FIG. 5, and this makes it difficult to enable the sensitivity temperature compensation of the bridge output to be readily effected by means a thermistor or the like.

Figure 6:
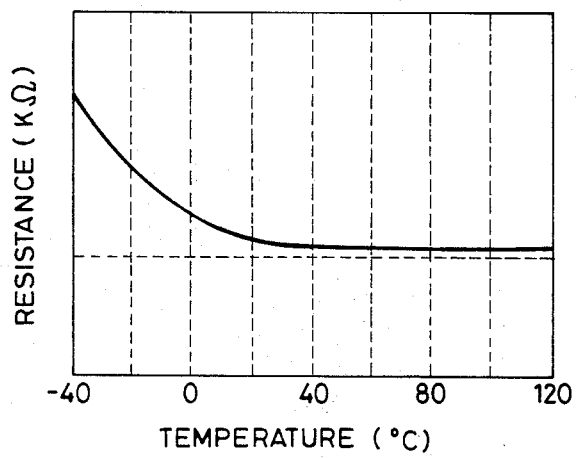
FIG. 6 is a chart showing the temperature-resistance characteristic of the thermistor which constitutes the constant-current circuit shown in FIG. 1.

The thermistor 3 which constitutes the sensitivity temperature compensation circuit 4 is defined by a thermistor which has a B constant ranging from 1400 to 2400K. The temperature-resistance characteristic of the thermistor 3 is shown in FIG. 6. As will be clear from the figure, the characteristic of the thermistor 3 is similar to the sensitivity variation coefficient characteristic of the diffused resistor bridge circuit shown in FIG. 4. More specifically, the thermistor 3 has a negative resistance temperature coefficient and shows a substantially constant resistance value in the high temperature region.

The following is a detailed description of the operation of the semiconductor pressure sensor having the above-described arrangement.

Referring to FIG. 1, the constant-current circuit 5 supplies a current for driving the bridge circuit 2 through the output terminal of the operational amplifier 6, and this driving current is determined by the voltage at the node B which is in turn determined by the resistance ratio between the sensitivity temperature compensation circuit 4 and the fixed resistor RI1. On the other hand, the current flowing through the bridge circuit 2 flows through the fixed resistor RI2 to cause a voltage drop, and this lowered voltage is applied to the negative (−) input terminal of the operational amplifier 6, thereby obtaining a constant driving current. In the low temperature region, the voltage drop in the sensitivity temperature compensation circuit 4 is increased by the operation of the thermistor 3, so that the current supplied to the bridge circuit 2 is decreased.

The operation of the semiconductor pressure sensor according to the present invention will be further described in detail with reference to FIG. 7. The driving current which is supplied to the bridge circuit 2 from the constant-current circuit 5 shows a negative variation coefficient in the low temperature region as shown by the curve A in the figure. On the other hand, the diffused resistors which constitute in combination the bridge circuit 2 show a positive sensitivity variation coefficient in the low temperature region as has already been described, and the bridge output therefore changes as shown by the curve B. These output characteristics A and B cancel each other to obtain an output characteristic the variation coefficient of which is substantially zero over a wide temperature range from −40° C. to 120° C. as shown by the curve C in the figure. It should be noted that the curve B in the figure shows the output characteristic measured when the driving current is set at 1 mA.

FIG. 8 shows the sensitivity variation coefficient characteristic of the bridge output in the case where the B constant of the thermistor 3 in the constant-current circuit 5 is varied. As will be understood from the figure, when the B constant of the thermistor 3 is within the range from 1400K to 2400K, the sensitivity variation coefficient of the bridge output can be suppressed within ±0.3% over the temperature range from −40° C. to 120° C.

As will be clear from the foregoing description, it is possible according to the present invention to provide a semiconductor pressure sensor having an excellent output characteristic which enables suppression of the sensitivity temperature coefficient with ±0.3% over a wide temperature range from −40° C. to 120° C.

What is claimed is:

1. In a semiconductor pressure sensor including a silicon single crystal elastic substrate whose surface tension changes in accordance with the pressure applied thereto, a strain gage defined by a P-type diffused layer formed on the surface of said substrate, a bridge circuit including said strain gage, a constant-current circuit for supplying a driving current to said bridge circuit, and an amplifier circuit for amplifying an output from the output terminals of said bridge circuit to form an output signal, the improvement comprising:

strain gages in said bridge circuit which are diffused resistor layers having a surface impurity concentration within the range from $2.3 \times 10^{18}$ to $2.5 \times 10^{18}$ atoms/cm$^3$; and thermistor means in said constant-current circuit, the thermistor means having a temperature-resistance characteristic for cancelling a temperature-resistance characteristic of said diffused resistor layers by selection of a B constant of the thermistor within the range from 1400K to 2400K, thereby effecting temperature compensation of sensitivity.

* * * * *